Patented Nov. 12, 1946

2,411,064

UNITED STATES PATENT OFFICE 2,411,064

2-CHLOROALKYLIMIDE CHLORIDES

Edwin W. Shand, Munster, Ind., assignor to Sinclair Refining Company, New York, N. Y., a corporation of Maine No Drawing. Application August 1, 1945, Serial No. 608,372

3 Claims. (Cl. 260—566)

This invention relates to new imide chlorides, namely, 2-chloropropionimide chloride and 2-chlorobutyroimide chloride having the formula

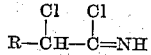

in which R is ethyl or methyl.

These new compounds are white crystalline products having relatively high melting points. Their dusts have an exceedingly irritating action on the nasal membranes, causing violent sneezing. Water converts them to amides and to be preserved they must be kept out of contact with it. Heating above the decomposition point yields hydrogen chloride and the corresponding nitriles. The products tend to decompose, giving off hydrochloric acid and are useful where a slow release of hydrochloric acid is desired, that is, to provide hydrochloric acid in small quantities over a period of time. They are also useful as insecticides and fumigants for the treatment of materials which are not adversely affected by the acid. They also serve as intermediates for the production of imino ethers, and for the production of diamides and triamides by treatment with organic acids and organic acid anhydrides respectively.

The new compounds of the invention are prepared by treating the corresponding 2-chloronitrile, that is, 2-chloropropionitrile or 2-chlorobutyronitrile with hydrogen chloride in the absence of water. It is advantageous to use low temperatures, for example about 10° C.

The invention will be illustrated by the following example but it is not limited thereto.

*Example.*—2-chloropropionitrile is placed in a reaction vessel and dry hydrogen chloride is bubbled through it for two hours. The conditions should be such as to provide good contact between the hydrogen chloride and the nitrile. Moisture must be excluded. As the hydrogen chloride is absorbed, there is a great increase in viscosity of the liquid, or actual precipitation of crystals of the product. The viscous solution finally obtained when washed with dry ether gives a crystalline compound, which is worked up by washing with dry ether and drying under vacuum. The 2-chloropropionimide obtained has a melting point of 175° C.

The 2-chlorobutyroimide chloride is obtained following the same procedure but using 2-chlorobutyronitrile. It melts at 177° C.

I claim:

1. Compounds of the formula

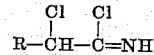

in which R is selected from the group consisting of ethyl and methyl radicals.

2. 2-chloropropionimide chloride.

3. 2-chlorobutyroimide chloride.

EDWIN W. SHAND.